(12) United States Patent
Yao et al.

(10) Patent No.: US 11,578,785 B2
(45) Date of Patent: Feb. 14, 2023

(54) SHORT-AXLE-DISTANCE LARGE-SPEED-RATIO GEAR SET STRUCTURE

(71) Applicant: Li-Ho Yao, Taipei (TW)

(72) Inventors: Li-Ho Yao, Taipei (TW); Norman Lien, Taipei (TW); Pei-Sheng Hsieh, Taipei (TW); Chi-Chen Tien, Taipei (TW); Pi-Jen Hsieh, Taipei (TW)

(73) Assignee: Li-Ho Yao, Taipei (TW)

( * ) Notice: Subject to any disclaimer, the term of this patent is extended or adjusted under 35 U.S.C. 154(b) by 0 days.

(21) Appl. No.: 17/558,607

(22) Filed: Dec. 22, 2021

(65) Prior Publication Data

US 2022/0196117 A1 Jun. 23, 2022

(30) Foreign Application Priority Data

Dec. 23, 2020 (TW) .................................. 109145760

(51) Int. Cl.
| | |
|---|---|
| *F16H 1/46* | (2006.01) |
| *F16C 3/02* | (2006.01) |
| *F16H 57/023* | (2012.01) |
| *F16H 1/28* | (2006.01) |

(52) U.S. Cl.
CPC .................. *F16H 1/46* (2013.01); *F16C 3/02* (2013.01); *F16H 57/023* (2013.01); *F16H 2001/2872* (2013.01)

(58) Field of Classification Search
CPC .................................. F16H 1/46; F16H 57/023
See application file for complete search history.

(56) References Cited

U.S. PATENT DOCUMENTS

| | | | | |
|---|---|---|---|---|
| 1,417,797 | A * | 5/1922 | Cook ..................... | F16H 1/2836 475/342 |
| 7,100,722 | B2 * | 9/2006 | Bowen .................... | H02P 7/298 180/65.51 |
| 10,630,140 | B2 * | 4/2020 | Pritchard .................. | B60K 1/02 |
| 10,876,596 | B1 * | 12/2020 | Bonny .................. | F16D 65/186 |
| 11,174,782 | B2 * | 11/2021 | Desjardins ................ | F02C 7/32 |

* cited by examiner

*Primary Examiner* — Derek D Knight
(74) *Attorney, Agent, or Firm* — Leong C. Lei (57) ABSTRACT

A structure includes a transmission axle rotatably mounted at a center of a housing. The transmission axle includes a sun gear mounted thereon. An internally-toothed ring track is fixed to an inner circumference of the housing. A planetary gear set is arranged between the sun gear and the internally-toothed ring track. The planetary gear set includes a plurality of stepped planetary gears arranged around the sun gear for self-spinning and orbiting around the sun gear. Each stepped planetary gear includes a first toothed portion meshing with both the sun gear and the internally-toothed ring track and a second toothed portion rotatable in unison with the first toothed portion. An output member is fit over the planetary gear set and includes an inner circumference formed with an internal toothed circumference meshing with the second toothed portion of each stepped planetary gear.

16 Claims, 6 Drawing Sheets

SHORT-AXLE-DISTANCE LARGE-SPEED-RATIO GEAR SET STRUCTURE

TECHNICAL FIELD OF THE INVENTION

The present invention relates to a gear set structure that features a short axle distance and a large speed ratio and is capable of effectively reducing the sizes thereof, while improving speed reduction performance.

DESCRIPTION OF THE PRIOR ART

A known reduction mechanism has only a limited speed reduction ratio. To achieve a relatively large speed reduction ratio, it is necessary to increase the gear ratio between the sun gear and the peripheral planetary gears. This would expand the outside diameter of the entire reduction device and also affects the output torque thereof. For this, the manufacturers have developed multi-staged planetary gears to overcome such a problem, such as Taiwan Utility Model Application No. 102200801, which discloses a planetary gear reducer, in which a gear carrier is provided with a first gear and a second gear mounted thereon, wherein the first gear is in meshing engagement with a sun gear and a fixed first ring gear, while the second gear is in meshing engagement with the sun gear and a second ring gear that is in connection with a transmission member. Since the first and second gears are individually mounted on the gear carrier and both are simultaneously in meshing engagement with the sun gear, when the gear ratio of the first and second gears is incorrect, interference occurs and easy generation of vibration noise during the operation may result. Also, the axle distance of the entire device is increased. Since the first and second gears must mesh the sun gear together, the range of the gear ratio is limited, making it not possible to enhance the effect of speed reduction.

In other words, the known reduction mechanism suffers incapability of reduction of size and increase of speed reduction ratio and may generate operation noise and vibration due to interference, and even causes wear and abrasion of gears to result in shortening of the service life thereof.

SUMMARY OF THE INVENTION

The primary objective of the present invention is to feature both a short axle distance and a large speed ratio, in order to effectively reduce the size and also to enhance the effect of speed reduction.

A second objective of the present invention is to reduce interference in order to make an overall operation smoother and to reduce vibration and noise.

A further objective of the present invention is to make the entire structure more stable and secured and to enhance the degree of meshing engagement, so as to reduce unnecessary wear and abrasion during operation, to thereby extend the service life and also to improve the transmission efficiency.

DETAILED DESCRIPTION OF THE PREFERRED EMBODIMENT

Figure 1:
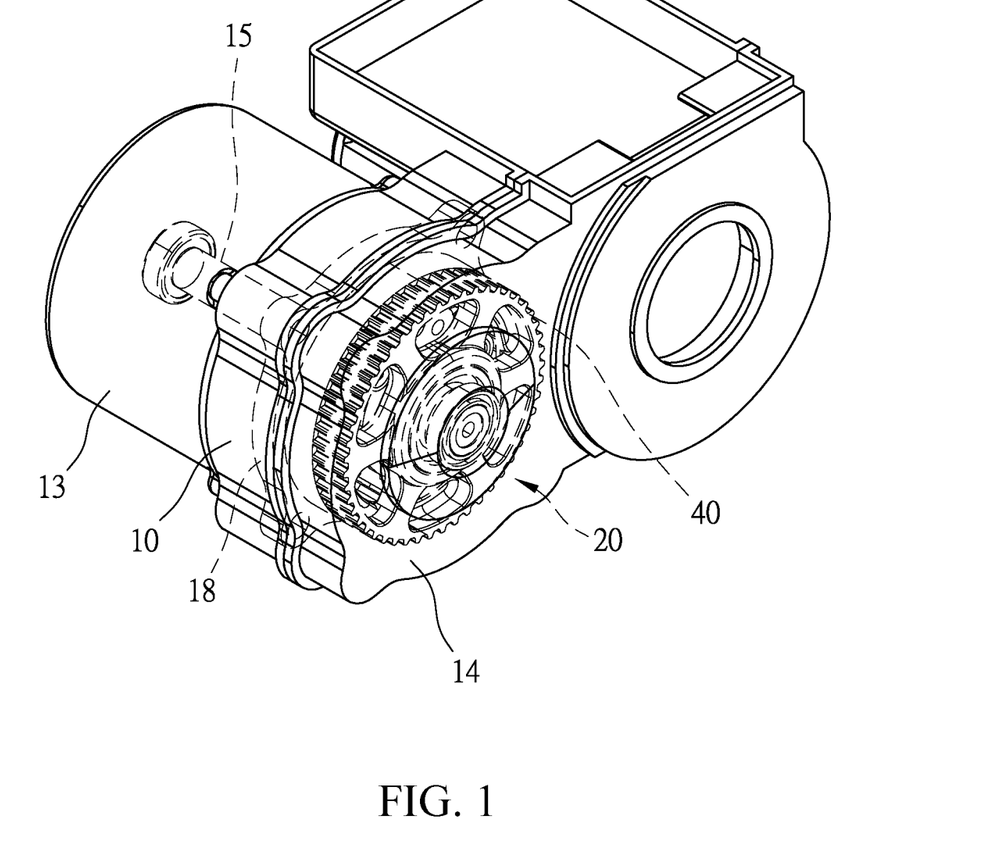
FIG. 1 is a perspective view showing the present invention.
Figure 2:
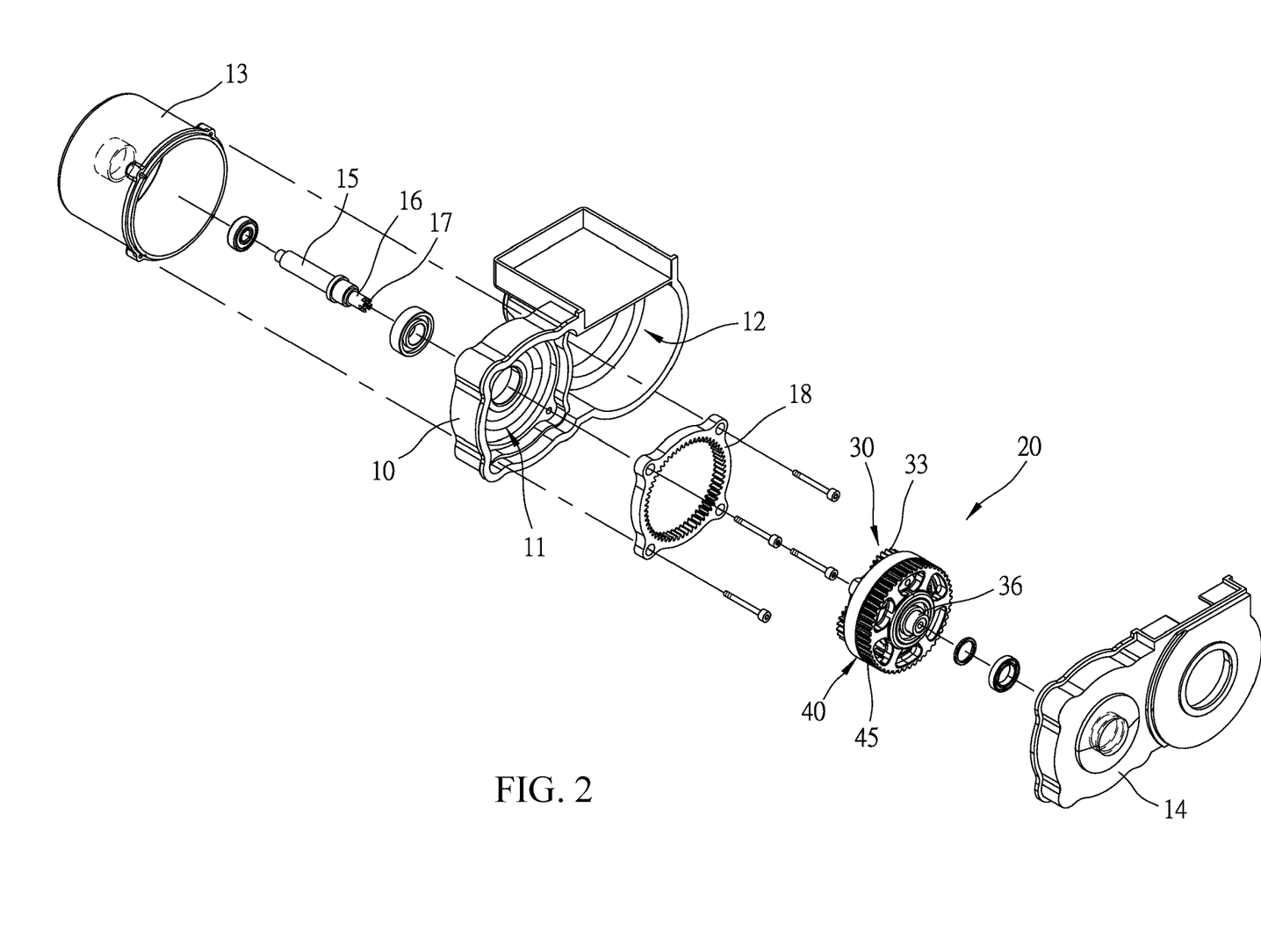
FIG. 2 is an exploded view showing the present invention.

A structure of the present invention, as shown in FIGS. 1 and 2, is made up of a housing 10, a transmission axle 15 arranged at a center of the housing 10, an internally-toothed ring track 18 arranged on an inner circumference of the housing 10, and a coaxial gear set 20 arranged between the transmission axle 15 and the internally-toothed ring track 18.

For a detailed structure of a preferred embodiment according to the present invention, reference being had to FIGS. 1 and 2, the housing 10 includes a first mounting compartment 11 and a second mounting compartment 12. The transmission axle 15 is rotatably arranged in the first mounting compartment 11 for mounting the coaxial gear set 20 that is arranged on the transmission axle 15. The second mounting compartment 12 is provided for disposition of a driven member (not shown in the drawings) in meshing engagement with the coaxial gear set 20. The housing 10 is provided, respectively at of a front end and a rear end thereof, with a first cover 13 and a second cover 14 fastened thereto and covering thereon for protection of internal components thereof. Two ends of the transmission axle 15 are rotatably mounted, as being each supported by a bearing, to the housing 10 and the first cover 13. The end of the transmission axle 15 that extends through the housing 10 is formed with a mounting section 16 and a coupling section 17 for receiving the coaxial gear set 20 to mount thereon and to realize an operative coupling relationship therebetween. The internally-toothed ring track 18 is fixed to the inner circumference of the first mounting compartment 11 of the housing 10 to receive the coaxial gear set 20 to mesh therewith.

Figure 3:
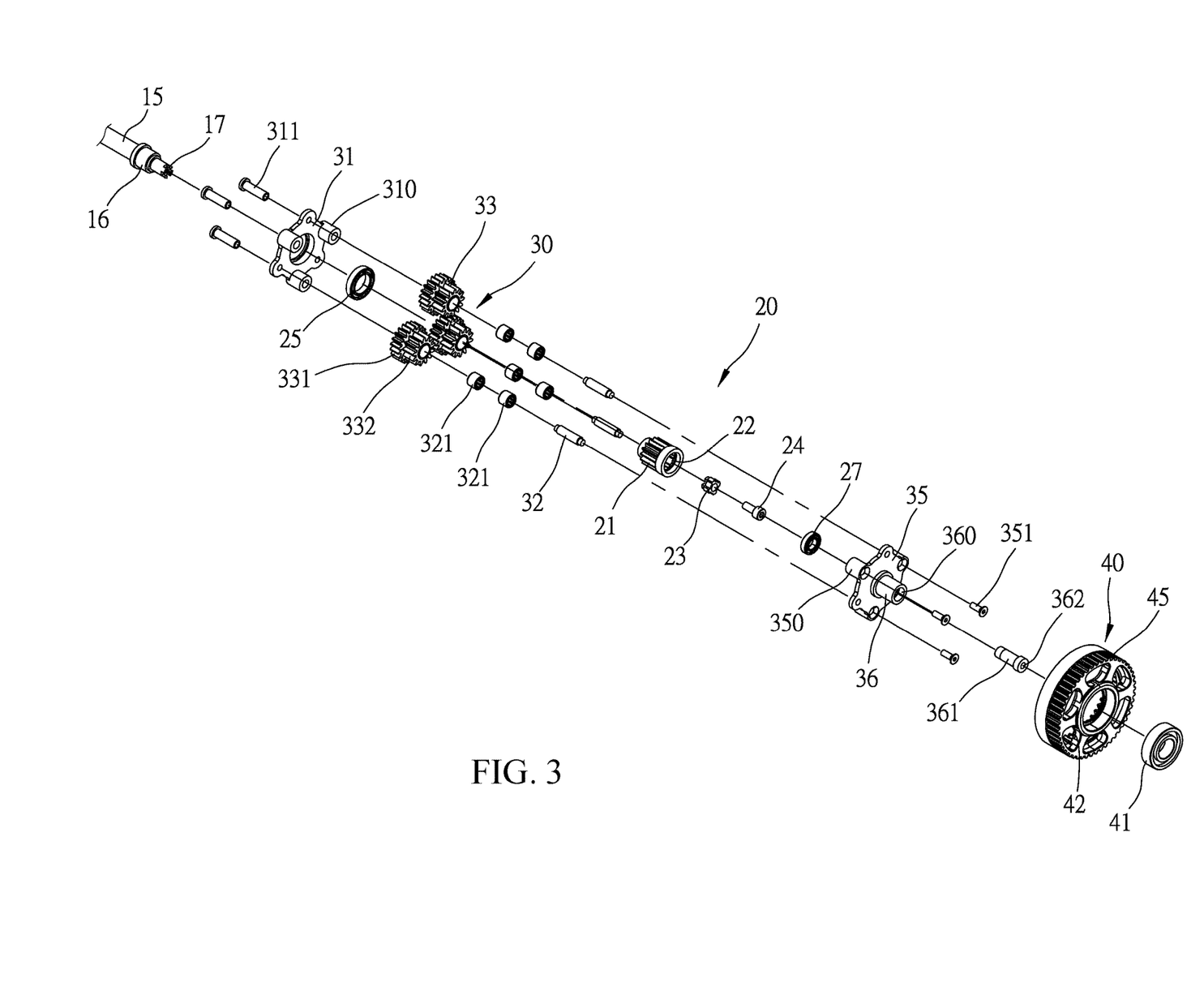
FIG. 3 is an exploded view showing a coaxial gear set according to the present invention.
Figure 4:
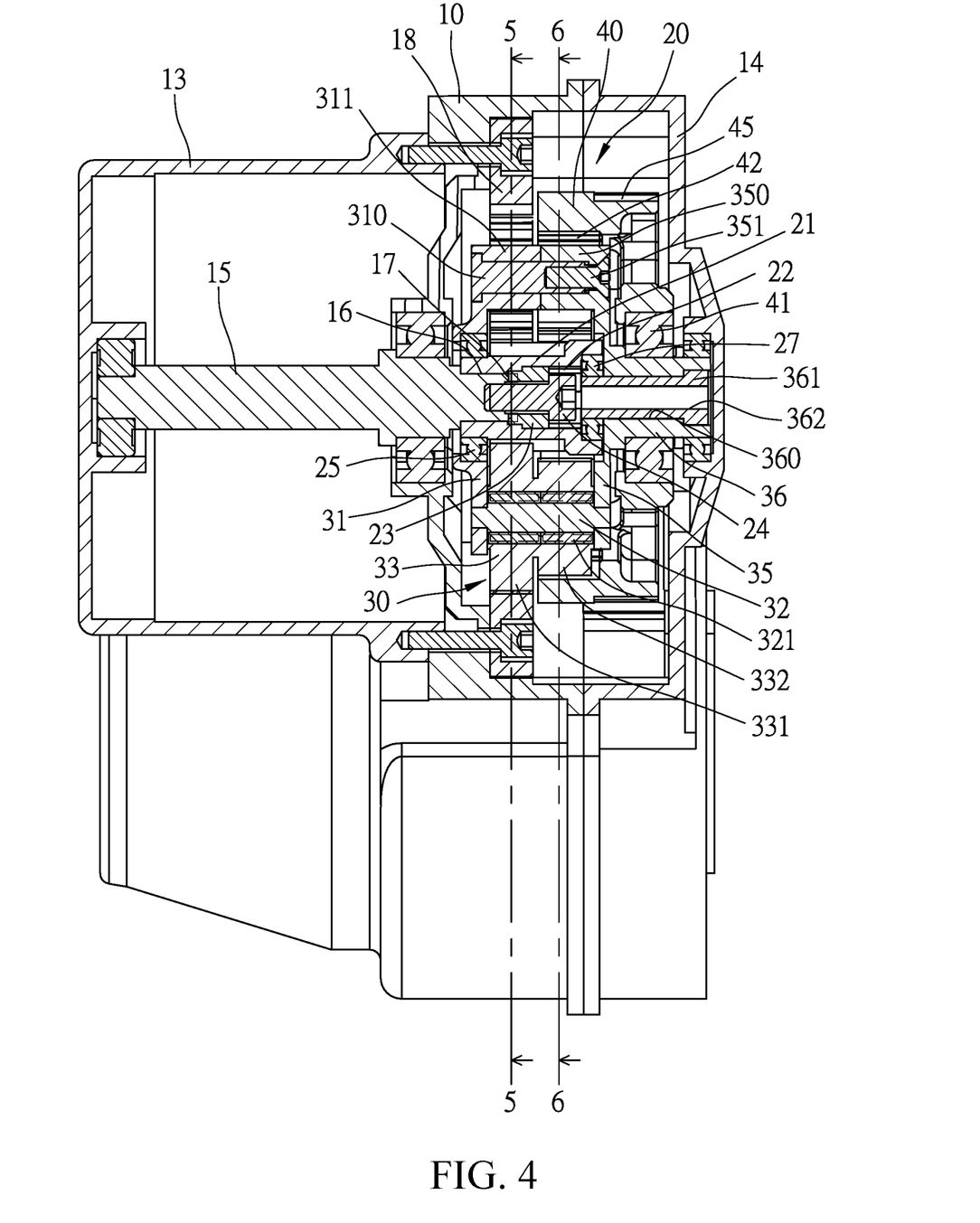
FIG. 4 is a cross-sectional view showing the present invention in an assembled form.
Figure 5:
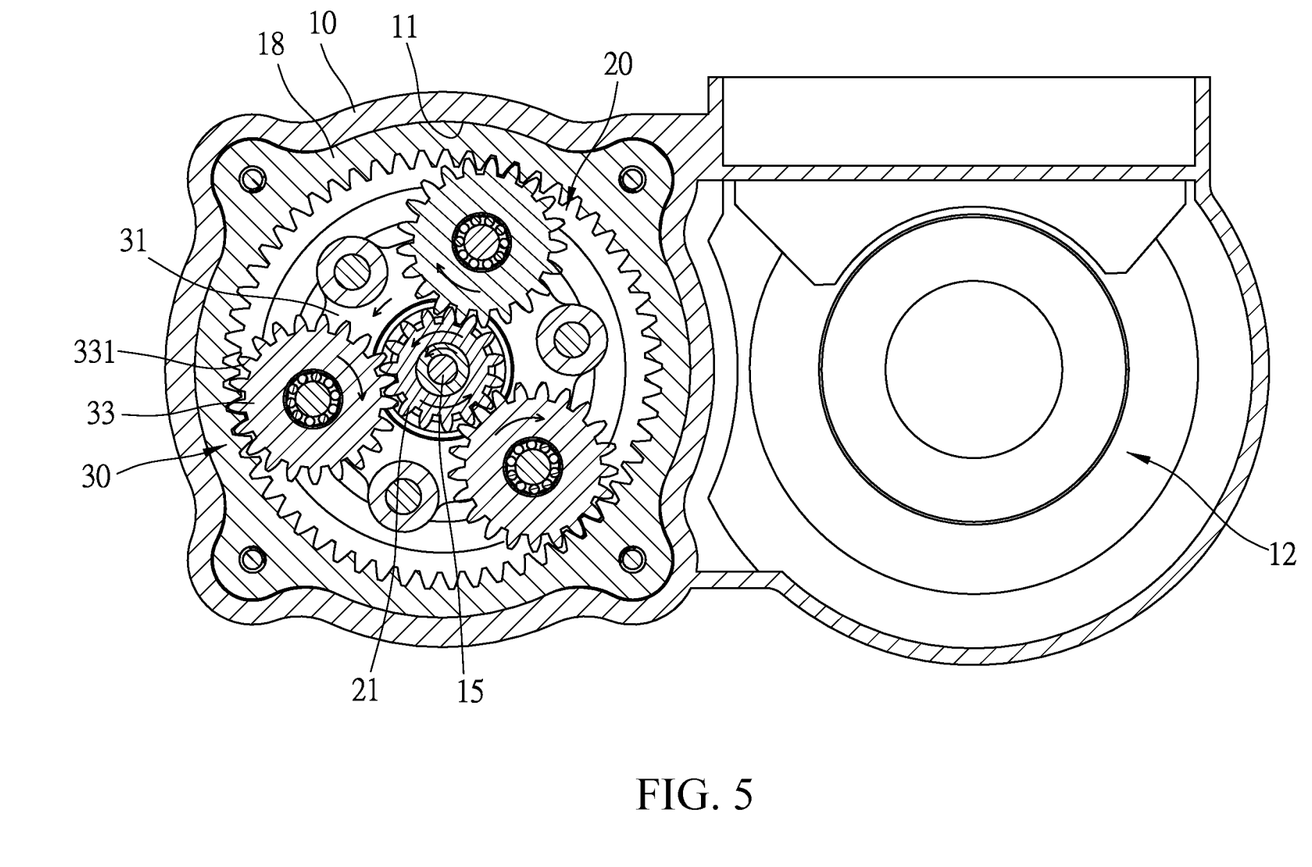
FIG. 5 is a cross-sectional view of the present invention taken along line 5-5 of FIG. 4.
Figure 6:
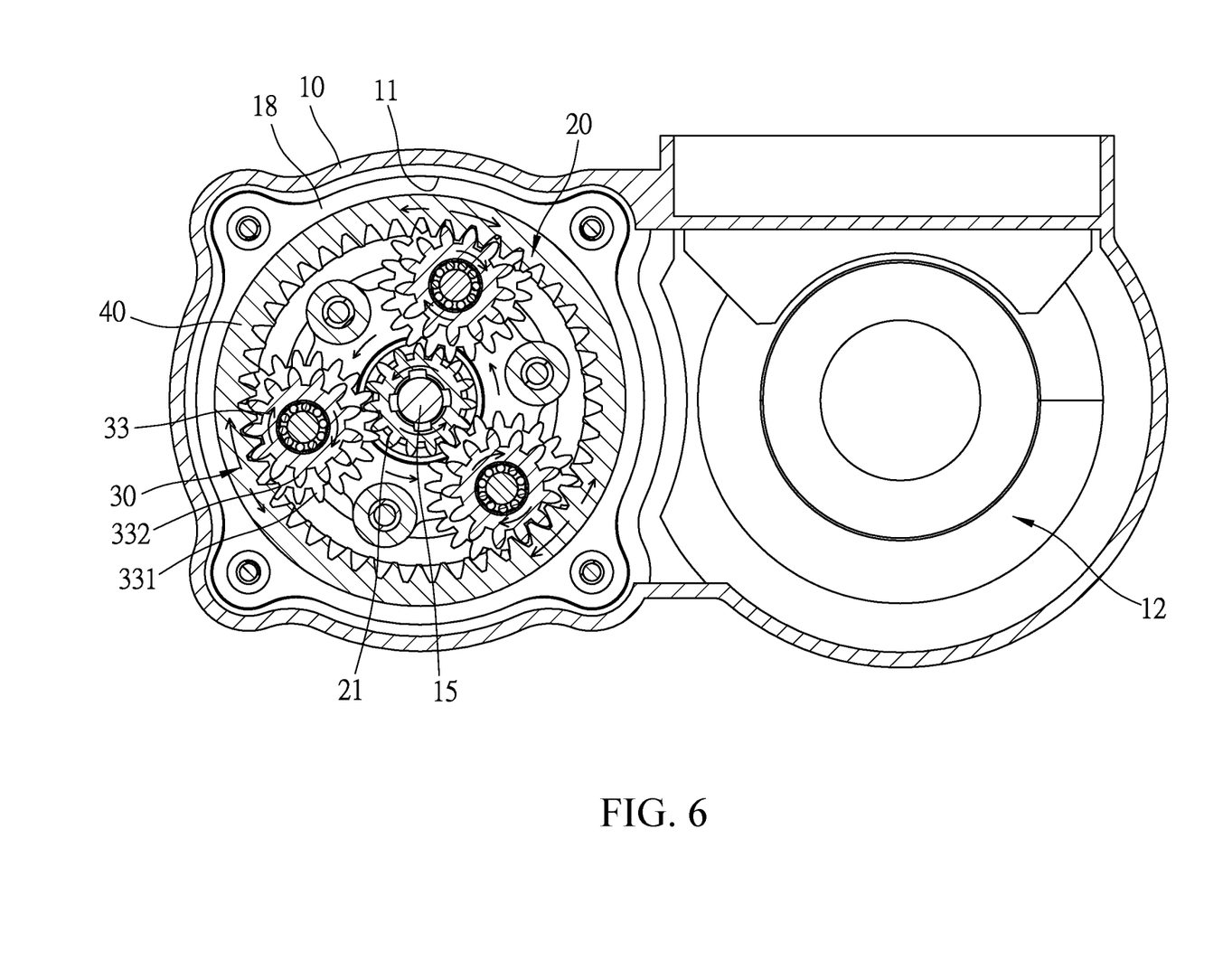
FIG. 6 is a cross-sectional view of the present invention taken along line 6-6 of FIG. 4.

For a detailed structure of the coaxial gear set 20, reference being had to FIGS. 2, 3, and 4, the coaxial gear set 20 comprises a modularized structure formed of a sun gear 21, a planetary gear set 30, and a output member 40, wherein the sun gear 21 and the transmission axle 15 are arranged as an integrated unity structure or a combined structure, and in the present invention, the sun gear 21 and the transmission axle 15 being arranged to form a combined structure is taken as a primary example. The sun gear 21 is formed, in a center thereof, with a coupling hole 22 that is fit over the mounting section 16 of the transmission axle 15. A coupling block 23 is inserted into and disposed in the coupling hole 22 to engage with the coupling section 17 of the transmission axle 15. A fastening member 24 penetrates through and presses on the coupling block 23 and is then fastened to the transmission axle 15 (as shown in FIG. 4), so that the coaxial gear set 20 is selectively mounted to the mounting section 16 of the transmission axle 15 by means of the sun gear 21, and the planetary gear set 30 is rotatably mounted on the sun gear 21 by means of a first bearing 25 and a second bearing 27 that are arranged at two ends of the sun gear 21. According to some embodiments, the first and second bearings 25, 27 of the planetary gear set 30 may alternatively arranged at two ends of the transmission axle 15 that correspond to the sun gear 21. Further, at the two ends of the sun gear 21, a first carrier frame 31 and a second carrier frame 35, and also a plurality of stepped planetary gears 33 that mesh with and surround the sun gear 21 are arranged, wherein the first carrier frame 31 is mounted by the first bearing 25 to one of the ends of the sun gear 21, and the second carrier frame 35 is provided, at a center thereof, with an axle tube 36 for mounting the output member 40, and a free end of the axle tube 36 is rotatably mounted, by means of a bearing, to the second cover 14 (as shown in FIG. 4). The axle tube 36 of the second carrier frame 35 is provided, at a center thereof, with a stepped mounting hole 360 that receives a mounting axle 361 to penetrate therein and press thereon, such that an end of the mounting axle 361 is mounted, by means of the second bearing 27, to an opposite one of the ends of the sun gear 21. The mounting axle 361 is formed with a through hole 362, which receives a hand tool to insert therein for operating the fastening member 24 of the coupling block 23 of the sun gear 21. Surfaces of the first and second carrier frames 31, 35 that face each other are respectively provided with a plurality of counterbored-hole pillars 310, 350, which are set in abutting engagement with each other and respectively receive threaded fastening elements 311, 351 to penetrate therethrough for mutually fastening to each other, so as to have the first and second carrier frames 31, 35 of the sun gear 21 to attach to each other as a unity. A plurality of axle bars 32 are arranged between the first and second carrier frames 31, 35 for mounting the stepped planetary gears 33. Each of the axle bars 32 rotatably supports a corresponding one of the stepped planetary gears 33 by means of at least one bearing 321. Each of the stepped planetary gears 33 includes a first toothed portion 331 (as shown in FIG. 5) that simultaneously mesh with both the sun gear 21 and the internally-toothed ring track 18, and each of the stepped planetary gears 33 is provided with a second toothed portion 332 (as shown in FIG. 6) located at one side and integrated with the first toothed portion 331 to mesh with the output member 40, so that the sun gear 21 of the coaxial gear set 20 may simultaneously drive the first toothed portions 331 of the stepped planetary gears 33 to cause each of the stepped planetary gears 33 to generate spinning in a reversed direction (relative to a rotation direction of the sun gear 21, this being applicable hereinafter), and at the same time, being constrained by the internally-toothed ring track 18, the stepped planetary gears 33 are caused to simultaneously generate orbiting relative to the sun gear 21 in the same direction (as shown in FIG. 5) for driving the planetary gear set 30. Further, the second toothed portions 332 of the stepped planetary gears 33 synchronously drive the output member 40 to generate an output of rotation in a reversed direction (as shown in FIG. 6), and due to the rotation of the planetary gear set 30 as the above-described orbiting in the same direction, a phenomenon of backward rotating is induced to thereby enhance an effect of reduction. The output member 40 is rotatably mounted, by means of a third bearing 41, to the axle tube 36 of the second carrier frame 35 of the planetary gear set 30. The output member 40 is formed, on an inner circumference thereof, with an internal toothed circumference 42 that is engageable with the second toothed portions 332 of the stepped planetary gears 33 of the planetary gear set 30, and the output member 40 is formed, on an outer circumference thereof, with a driving wheel portion 45 that is engageable with the driven member (not shown in the drawings). The driving wheel portion 45 can be an externally toothed wheel or a frictional wheel, and in the present invention, an externally toothed wheel is taken as an example of the driving wheel portion 45 of the output member 40.

As such, the first toothed portions 331 of the stepped planetary gears 33 of the planetary gear set 30 are set in synchronous meshing engagement with the internally-toothed ring track 18, while the second toothed portions 332 that are integrally formed therewith are in direct meshing engagement with the internal toothed circumference 42 of the output member 40, so as to form a short-axle-distance large-speed-ratio gear set structure.

An actual operation of the present invention will be described. As shown in FIGS. 3, 4, and 5, since the coaxial gear set 20 is arranged such that the planetary gear set 30 and the output member 40 are mounted on the sun gear 21, so that the coaxial gear set 20 can be formed as a modularized structure for directly mounting on the transmission axle 15, such that the first toothed portions 331 of the stepped planetary gears 33 of the planetary gear set 30 of the coaxial gear set 20 are in meshing engagement with the internally-toothed ring track 18 of the housing 10, and, with the fastening member 24 of the coupling block 23 of the sun gear 21 being fastened to the transmission axle 15, the transmission axle 15, when being driven, may synchronously drive the sun gear 21 of the coaxial gear set 20 to rotate in synchronization therewith, allowing the sun gear 21 to synchronously drive the planetary gear set 30 by means of the first toothed portions 331 of the stepped planetary gears 33 to cause each of the stepped planetary gears 33 of the planetary gear set 30 to generate spinning in a reversed direction (relative to the rotation direction of the sun gear 21, this being equally applied below), and due to being constrained by the internally-toothed ring track 18 that is fixed in position, the first and second carrier frames 31, 35 of the planetary gear set 30 are caused to drive each of the stepped planetary gears 33 to generate orbiting about the sun gear 21 synchronously and in the same direction (as shown in FIG. 5). The second toothed portion 332 of each of the stepped planetary gears 33, being in meshing engagement with the internal toothed circumference 42 of the output member 40, may synchronously drive the output member 40 to generate reversed-direction rotation (as shown in FIG. 6). Due to the rotation of the planetary gear set 30 as orbiting synchronously and in the same direction, the planetary gear set 30 is caused to generate a phenomenon of backward rotation, and this could enhance the effect of speed reduction. And, the output member 40, due to being coupled, by means of the driving wheel portion 45 of the outer circumference thereof, with the driven member, may drive the driven member (not shown in the drawings).

Based on the design and description provided above, the present invention provides that the coaxial gear set 20 is mounted on the transmission axle 15 of the housing 10, and the first toothed portion 331 of each of the stepped planetary gears 33 of the planetary gear set 30 are synchronously in meshing engagement with both the sun gear 21 and the internally-toothed ring track 18, and the second toothed portion 332 of each of the stepped planetary gears 33 is individually set in meshing engagement with the internal toothed circumference 42 of the output member 40, so as to achieve dual inputs and single output, and thus forming a short-axle-distance structure, allowing for size reduction. Further, the planetary gear set 30, when driving the output member 40, can rotate backward in a reversed direction to achieve a large speed ratio to further enhance the effect of speed reduction, and also to reduce interference, allowing the entire operation to be smoother and also helping reduce vibration and noise, thereby making the entire assembly structure of the reduction mechanism more secured and enhancing degree of meshing engagement to extend the service life thereof.

We claim:

1. A short-axle-distance large-speed-ratio gear set structure, comprising:
    a housing;
    a transmission axle, which is rotatably mounted in the housing, the transmission axle being provided with a sun gear;
    an internally-toothed ring track, which is fixed to the housing;
    a planetary gear set, which comprises a first carrier frame and a second carrier frame that are opposite to each other, a plurality of stepped planetary gears being rotatably arranged between the first and second carrier frames and around an outer circumference of the sun gear, each of the stepped planetary gears comprising a first toothed portion synchronously meshing with the sun gear and the internally-toothed ring track, each of the stepped planetary gears further comprising a second toothed portion that is rotatable in unison with the first toothed portion; and
    an output member, which has an inner circumference that is formed with an internal toothed circumference engageable with the second toothed portion of each of the stepped planetary gears, the output member having an outer circumference that is formed with a driving wheel portion for driving purposes.

2. The short-axle-distance large-speed-ratio gear set structure according to claim 1, wherein the housing comprises at least a first mounting compartment for mounting the transmission axle, the housing having a front end and a rear end that are respectively covered by a first cover and a second cover mounted thereto, two ends of the transmission axle being rotatably mounted, as being each supported by a bearing, between the housing and the first cover.

3. The short-axle-distance large-speed-ratio gear set structure according to claim 1, wherein one end of the transmission axle is formed with a mounting section and a coupling section, and the sun gear is formed, in a center thereof, with a coupling hole that is fit over the mounting section, a coupling block being inserted into and disposed in the coupling hole to engage with the coupling section of the transmission axle, a fastening member penetrating through and pressing on the coupling block to then fasten to the transmission axle.

4. The short-axle-distance large-speed-ratio gear set structure according to claim 1, wherein the second carrier frame of the planetary gear set is provided, at a center thereof, with an axle tube for mounting the output member, the axle tube rotatably supporting the output member by means of a third bearing.

5. The short-axle-distance large-speed-ratio gear set structure according to claim 4, wherein the axle tube of the second carrier frame is provided, at a center thereof, with a stepped mounting hole that receives a mounting axle to penetrate therein, one end of the mounting axle being rotatably mounted on an opposite end of the sun gear, wherein the mounting axle is formed with a through hole for receiving a hand tool to insert and operate therein.

6. The short-axle-distance large-speed-ratio gear set structure according to claim 1, wherein surfaces of the first and second carrier frames of the planetary gear set that face each other are respectively provided with a plurality of counter-bored-hole pillars, which are set in abutting engagement with each other and respectively receive threaded fastening elements to penetrate therethrough for mutually fastening to each other, so as to have the first and second carrier frames to attach to each other as a unity.

7. The short-axle-distance large-speed-ratio gear set structure according to claim 1, wherein a plurality of axle bars are arranged between the first and second carrier frames for mounting the stepped planetary gears, and each of the axle bars rotatably supports a corresponding one of the stepped planetary gears by means of at least one bearing.

8. The short-axle-distance large-speed-ratio gear set structure according to claim 1, wherein the driving wheel portion on the outer circumference of the output member includes an externally toothed wheel or a frictional wheel.

9. The short-axle-distance large-speed-ratio gear set structure according to claim 1, wherein the first and second carrier frames of the planetary gear set are rotatably mounted, by means of a first bearing and a second bearing arranged at centers thereof, to two ends of the sun gear, such that the sun gear, the planetary gear set, and the output member are assembled together as a modularized coaxial gear set.

10. The short-axle-distance large-speed-ratio gear set structure according to claim 2, wherein the first and second carrier frames of the planetary gear set are rotatably mounted, by means of a first bearing and a second bearing arranged at centers thereof, to two ends of the sun gear, such that the sun gear, the planetary gear set, and the output member are assembled together as a modularized coaxial gear set.

11. The short-axle-distance large-speed-ratio gear set structure according to claim 3, wherein the first and second carrier frames of the planetary gear set are rotatably mounted, by means of a first bearing and a second bearing arranged at centers thereof, to two ends of the sun gear, such that the sun gear, the planetary gear set, and the output member are assembled together as a modularized coaxial gear set.

12. The short-axle-distance large-speed-ratio gear set structure according to claim 4, wherein the first and second carrier frames of the planetary gear set are rotatably mounted, by means of a first bearing and a second bearing arranged at centers thereof, to two ends of the sun gear, such that the sun gear, the planetary gear set, and the output member are assembled together as a modularized coaxial gear set.

13. The short-axle-distance large-speed-ratio gear set structure according to claim 5, wherein the first and second carrier frames of the planetary gear set are rotatably mounted, by means of a first bearing and a second bearing arranged at centers thereof, to two ends of the sun gear, such that the sun gear, the planetary gear set, and the output member are assembled together as a modularized coaxial gear set.

14. The short-axle-distance large-speed-ratio gear set structure according to claim 6, wherein the first and second carrier frames of the planetary gear set are rotatably mounted, by means of a first bearing and a second bearing arranged at centers thereof, to two ends of the sun gear, such that the sun gear, the planetary gear set, and the output member are assembled together as a modularized coaxial gear set.

15. The short-axle-distance large-speed-ratio gear set structure according to claim 7, wherein the first and second carrier frames of the planetary gear set are rotatably mounted, by means of a first bearing and a second bearing arranged at centers thereof, to two ends of the sun gear, such that the sun gear, the planetary gear set, and the output member are assembled together as a modularized coaxial gear set.

16. The short-axle-distance large-speed-ratio gear set structure according to claim 8, wherein the first and second carrier frames of the planetary gear set are rotatably mounted, by means of a first bearing and a second bearing arranged at centers thereof, to two ends of the sun gear, such that the sun gear, the planetary gear set, and the output member are assembled together as a modularized coaxial gear set.

\* \* \* \* \*